US007520509B1

(12) United States Patent
Haber

(10) Patent No.: US 7,520,509 B1
(45) Date of Patent: Apr. 21, 2009

(54) CARD GAME

(76) Inventor: Jose Cherem Haber, Paseo de las Palmas 1260, Mexico D.F. (MX) 11000

( * ) Notice: Subject to any disclaimer, the term of this patent is extended or adjusted under 35 U.S.C. 154(b) by 176 days.

(21) Appl. No.: 10/979,858

(22) Filed: Nov. 1, 2004

(51) Int. Cl.
*A63F 9/24* (2006.01)
*A63F 13/00* (2006.01)
*G06F 17/00* (2006.01)
*G06F 19/00* (2006.01)

(52) U.S. Cl. ....................... 273/292; 273/274; 273/303; 273/306; 493/1; 493/13; 493/16; 493/42

(58) Field of Classification Search ............. 463/11–19; 273/270–280, 292, 303–306, 149 R
See application file for complete search history.

(56) References Cited

U.S. PATENT DOCUMENTS 5,794,934 A * 8/1998 Malcolm .................... 273/292
5,799,945 A * 9/1998 Boylan et al. ............... 273/292
5,813,673 A * 9/1998 Richardson ................. 273/292
5,868,392 A * 2/1999 Kraft .......................... 273/292
5,951,012 A * 9/1999 Feola ......................... 273/292
6,220,959 B1 * 4/2001 Holmes et al. ................ 463/13
6,371,485 B1 * 4/2002 Daines ....................... 273/303
6,481,719 B2 * 11/2002 Webb ......................... 273/292
6,511,068 B1 * 1/2003 Sklansky et al. ............ 273/237
6,511,070 B1 * 1/2003 Daines ....................... 273/292
6,655,690 B1 * 12/2003 Oskwarek ................... 273/292
7,066,465 B2 * 6/2006 Daines ....................... 273/292
7,159,868 B2 * 1/2007 Webb ......................... 273/274
2002/0000693 A1 * 1/2002 Webb ......................... 273/292
2002/0033577 A1 * 3/2002 Mims ......................... 273/292
2002/0190467 A1 * 12/2002 Braun ........................ 273/274
2004/0029628 A1 * 2/2004 Mugnolo et al. .............. 463/12
2004/0066000 A1 * 4/2004 Webb ......................... 273/292
2004/0070146 A1 * 4/2004 Snow ......................... 273/292
2004/0075215 A1 * 4/2004 Snow et al. ................. 273/292
2004/0080110 A1 * 4/2004 Webb ......................... 273/292
2004/0164491 A1 * 8/2004 Webb ......................... 273/274
2005/0253338 A1 * 11/2005 Daines ....................... 273/292
2005/0269772 A1 * 12/2005 Daddona .................... 273/273
2006/0027969 A1 * 2/2006 Schultz ...................... 273/292
2006/0284378 A1 * 12/2006 Snow et al. ................. 273/292
2007/0032284 A1 * 2/2007 Englman ..................... 463/13
2008/0258389 A1 * 10/2008 Friedman .................... 273/292

* cited by examiner

*Primary Examiner*—John M. Hotaling, II
*Assistant Examiner*—Paul A. D'Agostino
(74) *Attorney, Agent, or Firm*—Greenberg Traurig

(57) ABSTRACT

Disclosed is a card game wherein payouts are based on a maximum number of matching suits in a player's hand. Players have the option to choose the size of their hand at the outset of the game. In one live version, once players select their hand size and place their wagers, dealers deal each player two cards. Additional cards are dealt as common cards. Alternatively, players may be dealt all cards directly. Players are paid based on one of multiple pay tables depending on the maximum number of cards which have identical suits in their hand. The greater the number of identical suits in the hand, the greater the payout. Jackpots, including progressive jackpots, based on poker rankings may also be implemented. In a second live version, players may place six wagers on hands having from two to five cards. In this version, players receive four cards which may be used in combination with a single common card. Electronic gaming devices may also facilitate video versions of the game.

9 Claims, 9 Drawing Sheets

| 2 CARD HANDS | PAYOUT | HOUSE EDGE |
|---|---|---|
| NO MATCH | 0 | |
| TWO CARDS HAVE MATCHING SUITS | 3 TO 1 | 5.88% |

FIG. 2A

| 3 CARD HANDS | PAYOUT | HOUSE EDGE |
|---|---|---|
| 0 OR 1 MATCHING PAIR | 0 | |
| THREE CARDS HAVE MATCHING SUITS | 17 TO 1 | 6.8% |

FIG. 2B

| 3 CARD HANDS | PAYOUT | HOUSE EDGE |
|---|---|---|
| 0 OR 1 MATCHING PAIR | 0 | |
| THREE CARDS HAVE MATCHING SUITS (NO STRAIGHT FLUSH) | 10 TO 1 | |
| STRAIGHT FLUSH | 100 TO 1 | 23.5% |

FIG. 2C

| 4 CARD HANDS | PAYOUTS | HOUSE EDGE |
|---|---|---|
| THREE CARDS HAVE MATCHING SUITS | 3 TO 1 | |
| FOUR CARDS HAVE MATCHING SUITS | 20 TO 1 | 11.9% |
| FOUR CARDS FORM A STRAIGHT FLUSH OR ROYAL FLUSH | STRAIGHT FLUSH - 20 TO 1 PLUS 10% OF PROGRESSIVE ROYAL FLUSH - 20 TO 1 PLUS 100% OF PROGRESSIVE | 5.9% * |

* ASSUMING 6% OF MINIMUM WAGERS FOR FIVE-CARD HANDS IS DEDICATED TO PROGRESSIVE JACKPOT

*FIG. 2D*

| 5 CARD HANDS | PAYOUTS | HOUSE EDGE |
|---|---|---|
| LESS THAN THREE CARDS HAVING MATCHING SUITS | 0 | |
| THREE CARDS HAVE MATCHING SUITS | 1 TO 1 | |
| FOUR CARDS HAVE MATCHING SUITS | 4 TO 1 | |
| FIVE CARDS HAVE MATCHING SUITS | 20 TO 1 | 9.1% |
| FIVE CARDS FORM A STRAIGHT FLUSH OR ROYAL FLUSH | STRAIGHT FLUSH - 20 TO 1 PLUS 10% OF PROGRESSIVE ROYAL FLUSH - 20 TO 1 PLUS 100% OF PROGRESSIVE | 4.1% * |

* ASSUMING 5% OF MINIMUM WAGERS FOR FIVE-CARD HANDS IS DEDICATED TO PROGRESSIVE JACKPOT

*FIG. 2E*

CARD GAME

FIELD OF THE INVENTION

The embodiments of the present invention relate to a wagering game. More particularly, the embodiments relate to a wagering card game.

BACKGROUND

As gaming continues to enjoy widespread acceptance, increasingly casinos are in need of new games of chance to retain and attract patrons. While electronic gaming devices (e.g., slot machines) attract the most attention, many players prefer the skill requirements and personal interaction of live gaming. Thus, live gaming continues to be integral to the success of any casino.

Many popular table games like Blackjack, Caribbean Stud Poker® and Let it Ride® utilize playing cards to generate randomness. One reason playing cards are so popular is that most people are familiar with the basic appearance and rank of the card suits. Accordingly, game manufacturers and casino operators prefer live games utilizing playing cards because players enjoy them and tend to pick-up the rules and nuances of the games very quickly.

Importantly, the current population, especially that in the United States, demands new and improved games with regularity. In other words, very few games stand the test of time. Blackjack is one example of a live game which has lasted for decades and, in fact, has become even more popular over time. Blackjack is popular because it utilizes cards and is easy to play. Casino operators are fond of Blackjack because it is fast and provides a solid house advantage over most players.

Consequently, there continues to be a need for a new live game of chance which utilizes playing cards and which is easy and fast to play. It is also beneficial for the live card game to be implemented in an electronic format so that electronic game device players are attracted as well.

SUMMARY

Accordingly, a first embodiment of the present invention comprises a card game utilizing one or more standard decks of playing cards. The embodiments of the present invention are premised on acquiring a group of conventional playing card suits. In a first embodiment, players have the option of placing wagers on a two-card, three-card, four-card or five-card hand. Each version includes a pay table dependent upon the maximum number of cards having the same suit amongst the two, three, four or five cards forming the hand. For example, in a two-card hand, if both cards are the same suit the player wins his or her wager (e.g., 3 to 1) and if the suits are different the player loses his or her wager. Similarly, in a five-card hand, if three, four or five cards in the hand are of the same suit, the player wins a return on his or her wager.

In some embodiments, poker hands formed from the dealt cards facilitate a jackpot. For example, in a three-card hand, a three-card flush may pay 10 to 1 while a straight flush may pay 100 to 1. In other embodiments, a progressive jackpot is funded by a portion of each game wager or a separate side wager. For example, in a five-card hand, a straight flush may result in a payout of 20 to 1 plus a portion (e.g., 10%) of the progressive jackpot and a royal flush may result in a payout of 20 to 1 plus the entire progressive jackpot.

In another embodiment, an electronic gaming device facilitates play of the game. Electronic gaming devices are well-known by those skilled in the art and facilitate many wagering games, including Video Poker, Keno and Blackjack.

These and other objects and advantages of the present invention will be apparent from a review of the following detailed description, claims and drawings.

BRIEF DESCRIPTION OF THE DRAWINGS

FIG. 2A shows a pay table and associated house edge for a two-card hand;

FIG. 2B shows a first pay table and associated house edge for a three-card hand;

FIG. 2C shows a second pay table and associated house edge for a three-card hand;

FIG. 2D shows a pay table and associated house edge for a four-card hand;

FIG. 2E shows a pay table and associated house edge for a five-card hand;

DETAILED DESCRIPTION

Figure 1:
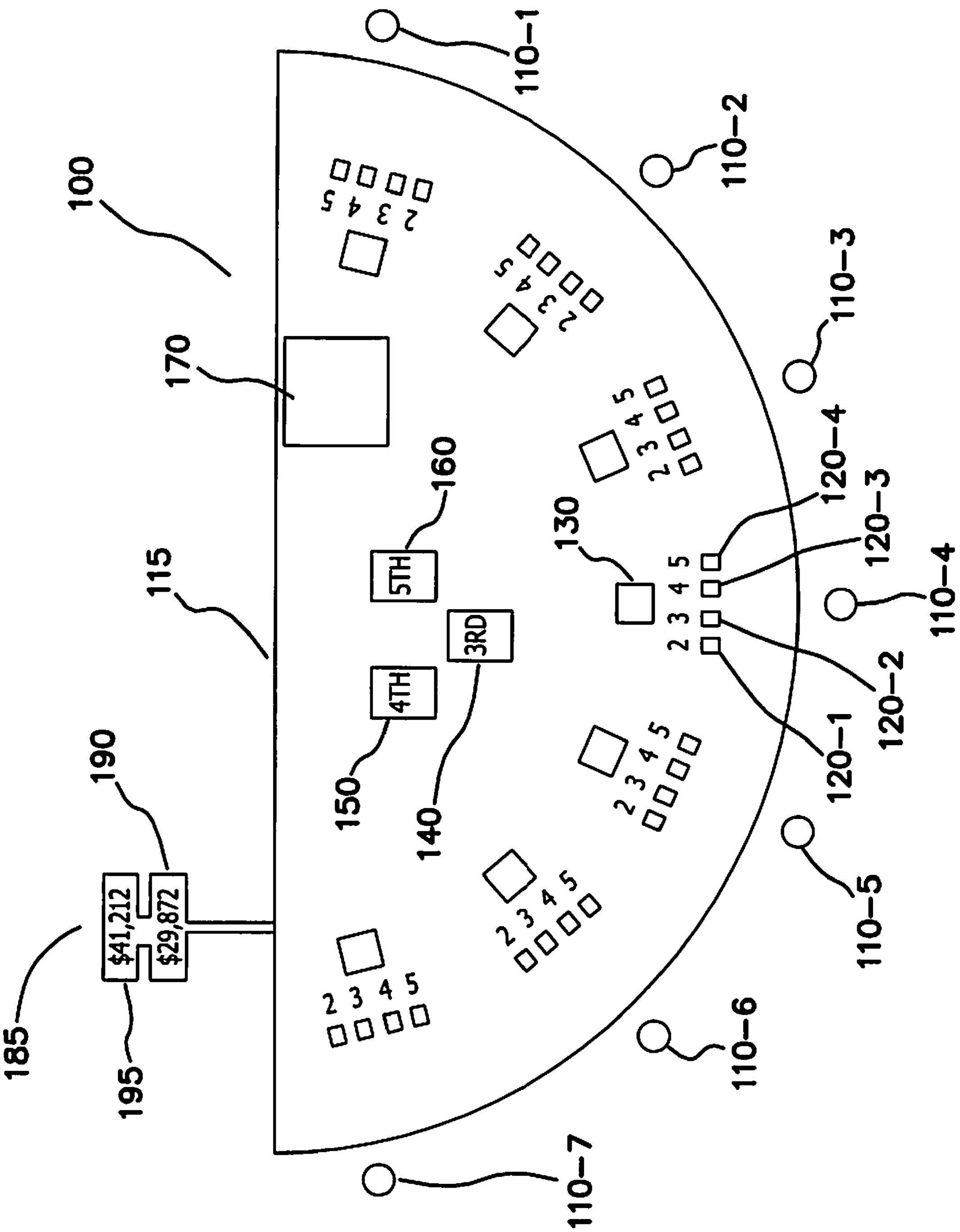
FIG. 1 shows a gaming table layout of a first live embodiment of the present invention.

Reference is now made to the figures wherein like parts are referred to by like numerals throughout. FIG. 1 shows a first gaming table layout generally referred to by reference numeral 100. The layout 100 accommodates seven player positions 110-1 through 110-7 and a dealer position 115. Each player position 110-1 through 110-7 includes four wager areas 120-1 through 120-4 and a player card placement area 130. The layout 100 incorporates a third common card area 140, a fourth common card area 150 and a fifth common card area 160. Optionally, the layout 100 incorporates a pay schedule 170 and the gaming table supports a display device 185 for displaying a four-card jackpot amount 190 and a five-card jackpot amount 195. Although not shown, the gaming table may also support an automatic card shuffling machine and/or card shoe.

In a first embodiment, the game is played using a standard deck of fifty-two playing cards. Initially, each player has the option of placing wagers on a two-card, three-card, four-card and/or five-card hand. These wagers are placed in one or more of the wagering areas 120-1 through 120-4. Acceptable wager amounts (e.g., $1 to $100) are dictated by the casino offering the game. Traditionally, different tables provide differing ranges of allowable wagers to accommodate all types of players. After each player has placed his or her wagers, the dealer deals each player two player cards in player card placement area 130 and then common cards into the third card area 140, fourth card area 150 and the fifth card area 160. Alternatively, the dealer may only deal enough common cards to cover the largest hand, by number of cards, wagered on by one of the players. For example, if at least one player has placed a three-card wager, the dealer deals a third card in third card area 140 and if at least one player has placed a four-card wager, the dealer deals a fourth card in the fourth card area 150 and if at least one player has placed a five-card wager, the dealer deals a fifth card in fifth card area 160. Other deal arrangements are conceivable including the dealer dealing a first card to the player, then dealing the third common card in the third card area 140, then dealing each player a second card and then dealing the fourth and fifth cards in areas 150 and 160, respectively. Any number of deal arrangements is conceivable and, like the ranges of allowable wagers, is dictated by the casino offering the game.

Once all cards have been dealt, the dealer resolves player wagers according to the appropriate pay-table. That is, two-card winning wagers are paid according to a two-card pay table, three-card winning wagers are paid according to a three-card pay table and so on. Example pay tables are shown in FIGS. 2A-2E. It is noted that the payouts shown are illustrative and may be modified as desired by the casino offering the game.

While layout 100 shows the third, fourth and fifth card areas 140, 150 and 160 for dealing common cards, the third, fourth and fifth cards may also be dealt directly to each player such that each player is dealt his or her own unique hand of cards. In practice, the dealing of the cards may take any suitable form as long as the player can use the number of cards corresponding to the wagers he or she has placed.

With larger hands (e.g., three cards or more) it is also attractive to incorporate a jackpot or premium payout based on the suits and ranks of the dealt cards. In a three-card hand, there may be a jackpot or premium payout for a three-card flush and a three-card straight flush. The probabilities allow the house to offer very attractive payouts such as 10 to 1 on the flush outcome and 100 to 1 on the straight flush outcome. In comparison, Three Card Poker provides a 40 to 1 return on a straight flush. As set forth above with respect to the primary game payouts, the jackpot and premium payouts suggested herein are illustrative only.

Depending on the size of the card hand, a progressive jackpot may be implemented as well. Progressive jackpots are typically funded at a minimum level (e.g., $3,000) and continue to increase until a player wins the jackpot. In an alternative manner, the progressive jackpot may start at zero, but the casino would then pay a minimum amount (e.g., $2000) if the current progressive jackpot was below $2000 when won. In either case, the increasing progressive jackpot may be funded by a mandatory side wager (e.g., $1) or may draw money (e.g., 5%) from each player's wager up to the casino minimum wager amount. That is, regardless of the size of the player's wager, the progressive jackpot is funded only from a percentage of the minimum table wager. For example, with a 5% draw at a $5 minimum table, a $5 wager contributes 25¢ to the progressive jackpot while a $50 wager contributes the same 25¢ to the progressive jackpot based on the $5 minimum table wager. In this fashion, the casino edge dramatically increases for any wager above the minimum casino wager. When implemented, the progressive jackpot may provide, for example, a 10% payment corresponding to a straight flush and a 100% payment corresponding to a royal flush.

It is conceivable that hands comprising six, seven or even more cards may also be used to play the game described above. While each of the cards may be used to determine the outcome of the game, in certain embodiments only five cards of the six, seven or more cards are used to determine the outcome.

Figure 3:
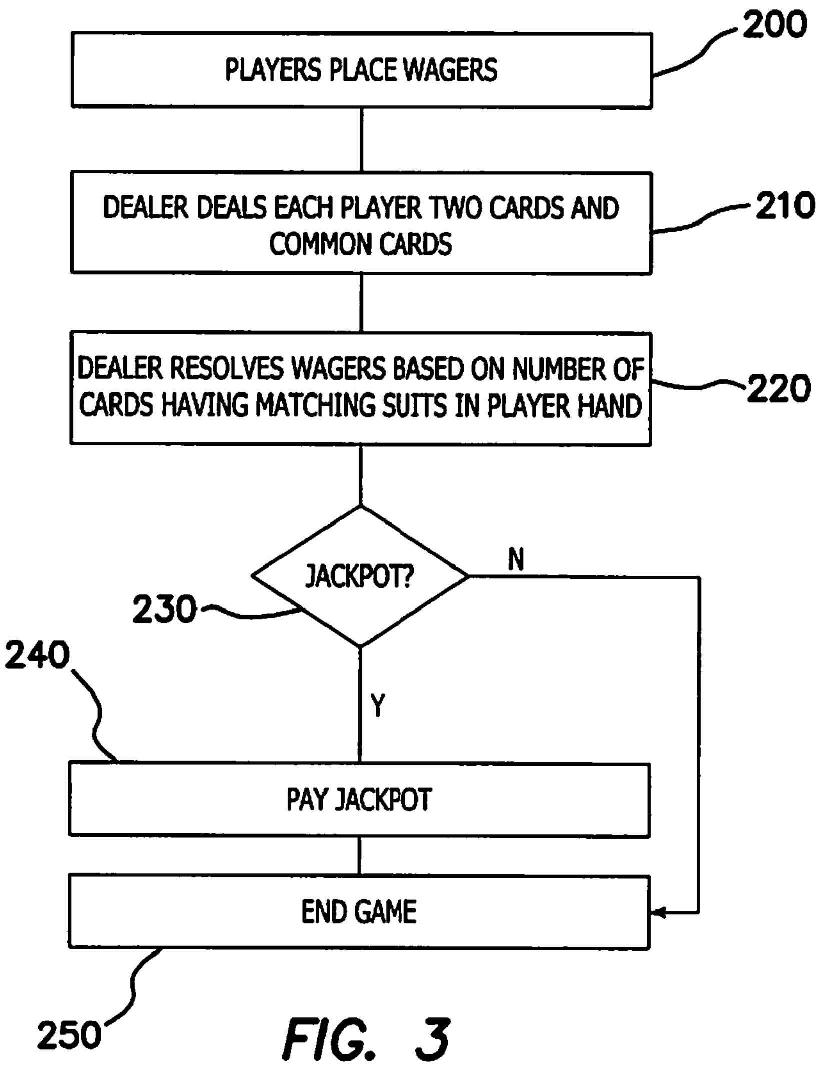
FIG. 3 shows a flow chart detailing one method of play of the first embodiment of the present invention.

FIG. 3 shows a flow chart detailing one method of play of one embodiment of the present invention. At step 200, players place wagers in one or more of the four wager areas 120-1 through 120-4. If a progressive jackpot is implemented, players may also be required to place a side wager to participate in the progressive jackpot pool or money may be drawn from a percentage of each minimum casino wager on four or five-card hands. At step 210, the dealer deals each player their two cards and then common cards in common card areas 140, 150 and 160, respectively. At step 220, the dealer resolves each player primary wager according to the pay table corresponding to the player wager (i.e., 2, 3, 4 and/or 5 cards). At step 230, the dealer determines whether any players are eligible for a jackpot and, if so, the dealer pays the jackpot at step 240. At step 250, the game ends.

Figure 4:
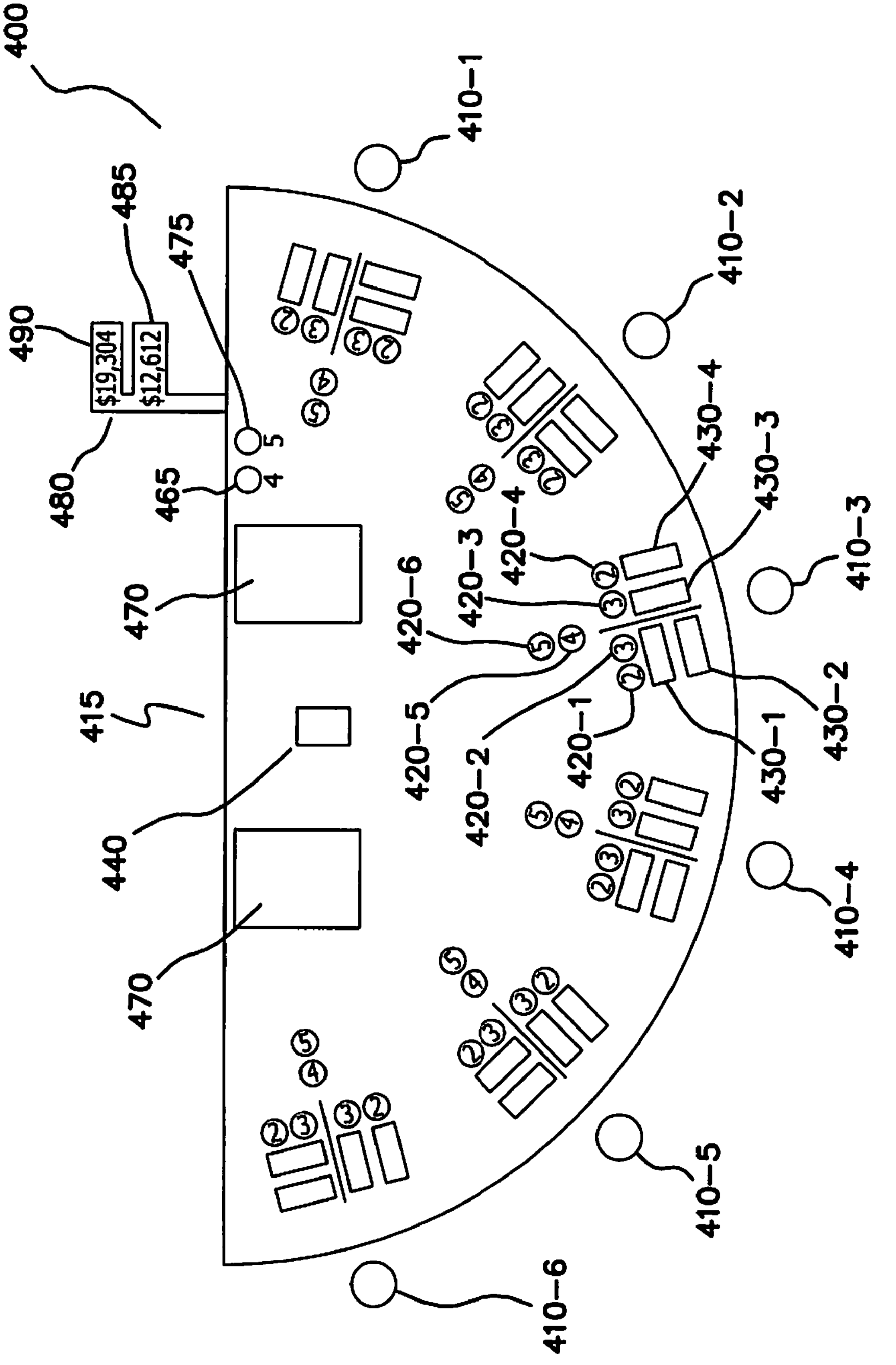
FIG. 4 shows a gaming table layout of a second live embodiment of the present invention.

FIG. 4 shows a second gaming table layout generally referred to by reference numeral 400. The layout 400 accommodates six player positions 410-1 through 410-6 and a dealer position 415. Each player position 410-1 through 410-6 includes six wager areas 420-1 through 420-6 and a four player card placement areas 430-1 through 430-4. The first card placement areas 430-1 and 430-2 accommodate the placement of the cards horizontally while the second card placement areas 430-3 and 430-4 accommodate the placement of the cards vertically. The layout 400 also incorporates a common card area 440. Optionally, the layout 400 incorporates one or more pay schedules 470. The gaming table supports a display device 480 for displaying jackpot amounts related to four-card hands 485 and five-card hands 490. When a draw is used to fund the progressive jackpot, display control buttons 465, 475 or similar interface means permit the dealer to advance the progressive jackpots amounts displayed on display 480 as players place wagers on four-card hands and five-card hands. The buttons 465, 475 may either be hard-wired to the display device 480 or may be in wireless communication with the display device 480.

In this second live embodiment, players are able to place six separate wagers. Each player position includes six wager areas 420-1 through 420-6 for allowing players to identify their wagers. A first two-card wager and three-card wager area 420-1, 420-2 and a second two-card and three-card wager area 420-3, 420-4 are separated by a vertical line 425. In this manner, the first two-card wagers and three-card wagers are dependent upon the first two cards received by each player and the common card dealt in common card area 440. The first two cards are placed in the card placement areas 430-1 and 430-2. The second two-card wagers and three-card wagers are dependent upon two additional cards dealt to each player and the common card in common card area 440. The second two cards are placed in the card placement areas 430-3 and 430-4. A four-card wager depends upon the four cards now in card placement areas 430-1 through 430-4. A five-card wager depends upon the four cards in card placement areas 430-1 through 430-4 and the common card in common card area 440.

Four card and five card progressive jackpots are tracked by the display 490. To increase the jackpots, the dealer may utilize the buttons 465, 475 to advance the progressive jackpot amount based on how many players have placed four and five-card wagers. As set forth above, it is also possible for players to place a separate side wager which is entirely dedicated to the progressive jackpots.

Figure 5:
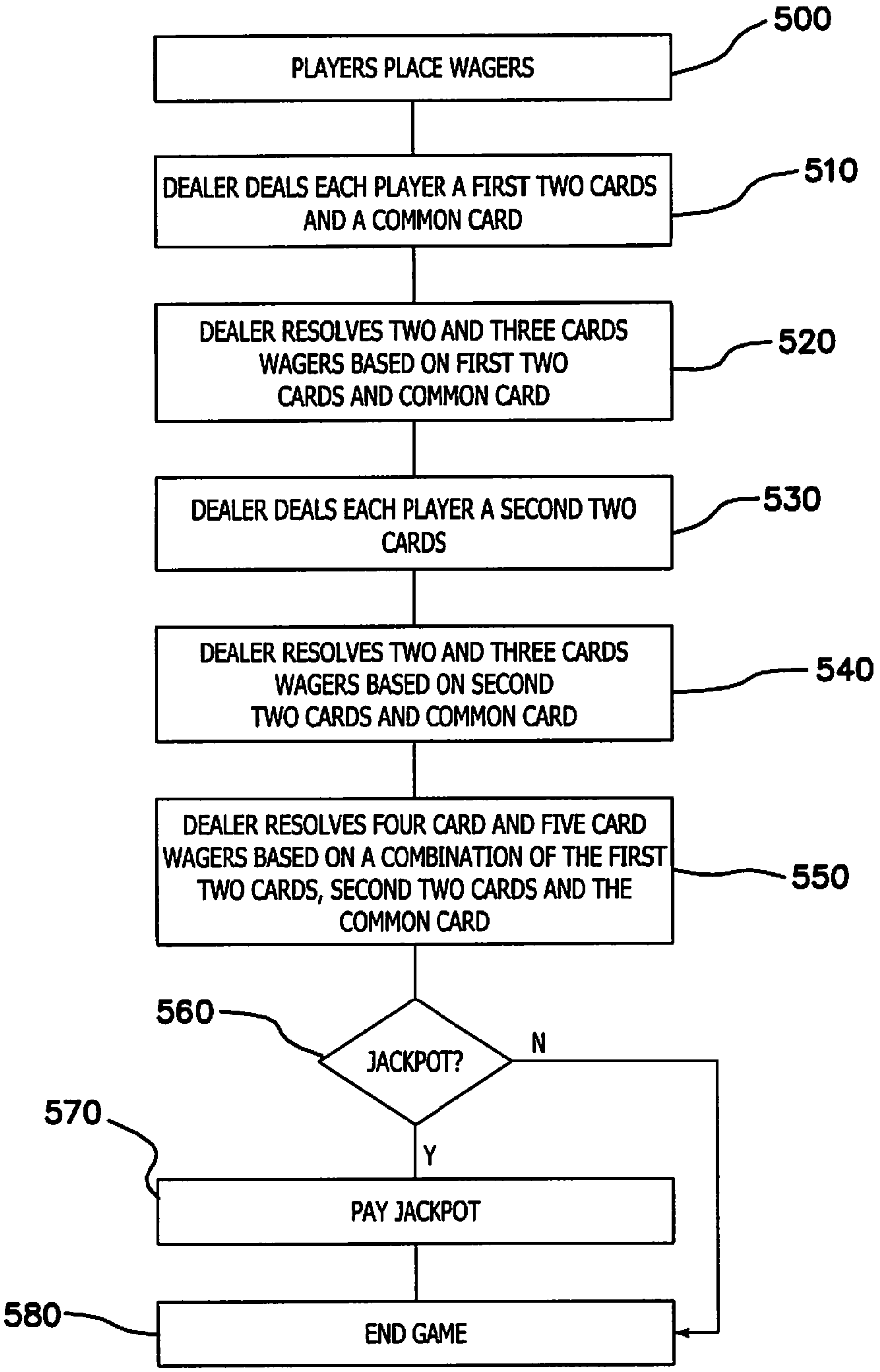
FIG. 5 shows a flow chart detailing one method of play of the second embodiment of the present invention.

Now referring to FIG. 5, a flow chart details one method of play of the second embodiment of the present invention. At step 500, players place wagers in one or more of the six wager areas 420-1 through 420-6. If a progressive jackpot is implemented, players may also be required to place a side wager to participate in the progressive jackpot pool or money may be drawn from a percentage of each minimum casino wager placed on four or five-card hands. If the draw is incorporated, the dealer utilizes buttons 465, 475 to advance the progressive jackpot amount. At step 510, the dealer deals each player their first two cards and then the common card in common card area 440. The first two cards are placed, either by the dealer or the player, in card areas 430-1 and 430-2. At step 520, the dealer resolves each player wager placed in the first wager areas 420-1 and 420-2. Resolution of the wagers in areas 420-1 and 420-2 is based on the first two cards and the common card. Then, at step 530, the dealer deals each player their second two cards. Similar to the first two cards, the second two cards are placed in card areas 430-3 and 430-4. At step 540, the dealer resolves each player wager placed in the second wager areas 420-3 and 420-4. Resolution of the wagers in areas 420-3 and 420-4 is based on the second two cards and the common card. At step 550, the dealer resolves all four-card and five-card wagers placed in wager areas 420-5 and 420-6. Resolution of the four-card wagers is based on the first two cards in combination with the second two cards. Resolution of the five-card wagers is based on the first two cards, the second two cards and the common card. Again, all wagers are dependent on the maximum number of matching suits in the hand. At step 560, the dealer determines whether any players are eligible for a jackpot and, if so, the dealer pays the jackpot or causes the jackpot to be paid at step 570. At step 580, the game ends.

While the description above details a live game, an electronic gaming device may facilitate an electronic embodiment of the game. In a first electronic embodiment, once wagers are accepted by the device, the player is provided with his or her cards which are viewable on a display device. Then, the device processor determines whether the player has won or lost and resolves the player wager accordingly.

Figure 7:
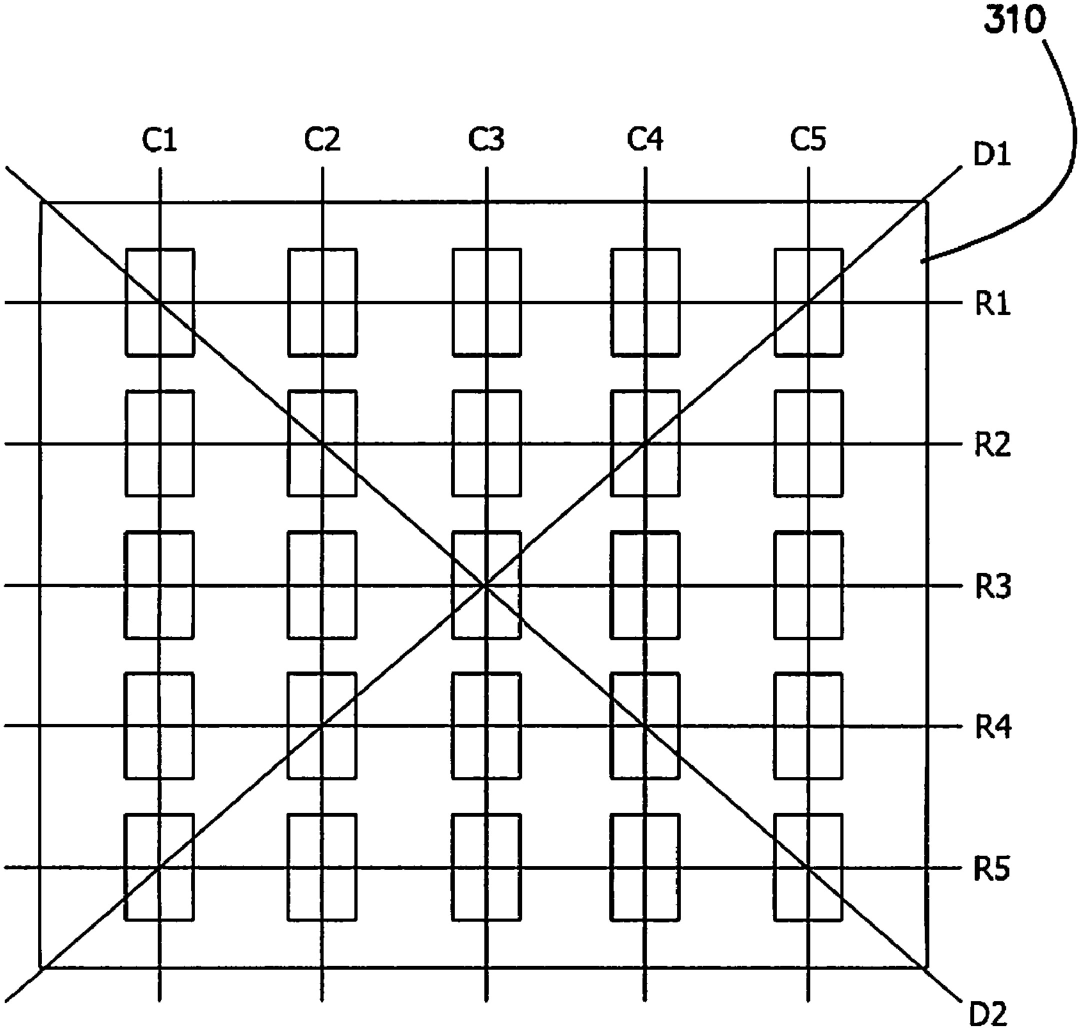
FIG. 7 shows a gaming device display of multiple five-card hands.

With the electronic gaming device, multiple hands of cards may be dealt simultaneously using a single deck or separate decks for each hand. FIG. 7 shows a display device 310 displaying five rows of five cards each. The payouts may then be based on the cards in each of the rows (R1-R5), columns (C1-C5) and/or diagonals (D1-D2) depending on the wagers placed by the player. That is, to play all twelve pay lines, the player may be required to place the equivalent of twelve separate wagers or the player may need only place a single wager or the player may wager on less than all twelve pay lines. The jackpots, including the progressive jackpot, may also be implemented in the electronic embodiment as well. The jackpot can be based on the cards in one pre-selected row (e.g., R5), column (e.g., C1) ordiagonal (e.g., D2) or may correspond to the cards in each and every pay line. In practice, a series of linked electronic gaming devices is used to fund a progressive jackpot.

Figure 8:
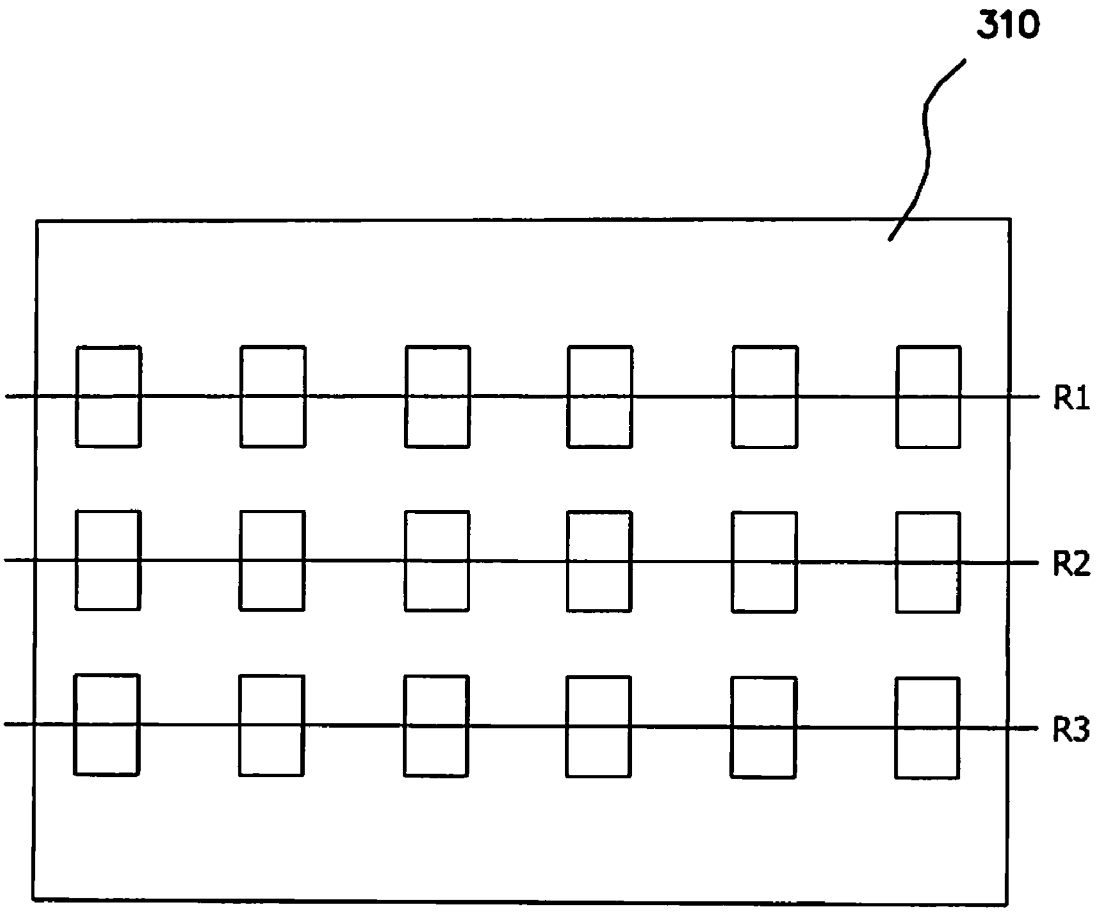
FIG. 8 shows a gaming device display of multiple six-card hands.

FIG. 8 shows a six-card game displayed on a display screen 310. In this embodiment, the player receives three rows (R1-R3) of six cards. Again, the cards in any row or a pre-selected row may be dedicated to a jackpot. It should be noted that any electronic embodiment, including those shown in FIGS. 7 and 8, may be played on a live gaming table as well.

Figure 6:
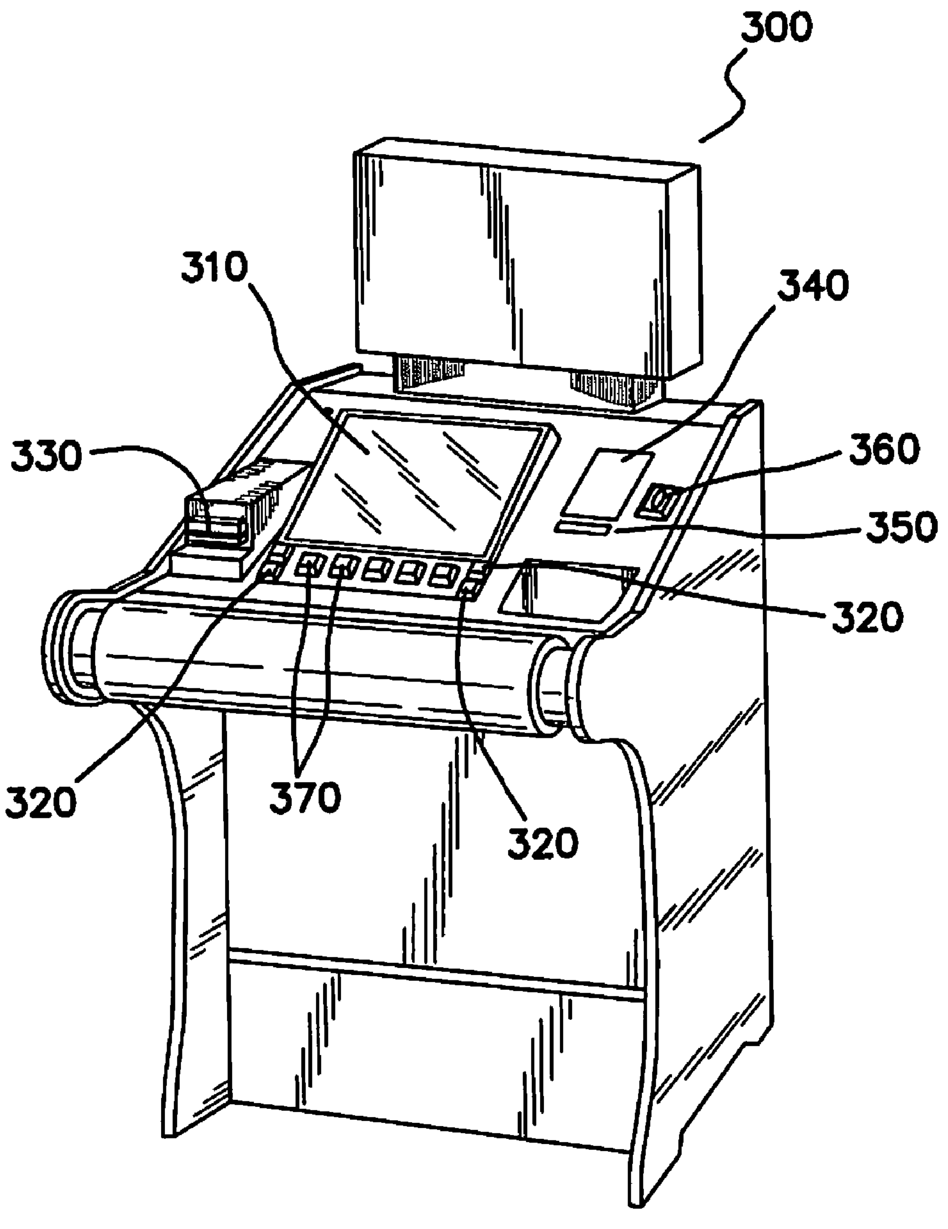
FIG. 6 shows a gaming device of the type which may implement an electronic version of the game.

FIG. 6 illustrates an electronic gaming device, generally designated as reference numeral 300, of the type that may be used to implement the embodiments of the present invention in an electronic format. The external features of the gaming device 300 include a display 310, wager selection buttons 320, card reader 330, credit display 340, bill reader 350, coin input 360 and number of cards buttons 370. However, the display 310 may also comprise touch screen technology to facilitate simple player interaction. Device switches and similar physical components may also act as player interfaces.

The operation of the gaming device 300 is controlled by a microprocessor that communicates with an internal memory device and the external features of the device 300. The microprocessor also incorporates, or communicates with, a random number generator which ensures the randomness of the cards dealt during the play of the game. Since the technology for operating and controlling gaming devices is well known to those skilled in the art, the subtle details are not described herein.

It will evident to those skilled in the art that any number of player cards and/or common cards may be utilized to develop a game based on matching card suits. For example, as set forth above, there may be no common cards. Or, there may be only one player card and a plurality of common cards. Also, additional wagers, including wagers on seven-card hands, are conceivable. Thus, the specific live and electronic embodiments disclosed herein should not be used to limit the scope of the claims herein.

Although the invention has been described in detail with reference to several embodiments, additional variations and modifications exist within the scope and spirit of the invention as described and defined in the following claims.

I claim:

1. A method of conducting a wagering game comprising:

providing a set of cards;

accepting one or more wagers from one or more players, each of said players having an option to place wagers on hands comprising two, three, four and five cards, said wagers being accepted only prior to any cards being dealt;

dealing up to three common cards;

dealing each player two cards;

forming player hands by combining zero, one, two and/or three of said common cards with said two player cards based on each player's one or more wagers, wherein the number of common cards combined with said two player cards is dictated by a largest number of cards on which a player wager has been placed; and resolving each player's one or more wagers based on a maximum number of matching card suits in the player's one or more hands formed using the two player cards in combination with zero, one, two and/or three of the common cards.

2. The method of claim 1 wherein a jackpot award corresponds to a flush formed by the cards in each wagering players' hand.

3. The method of claim 1 facilitated by an electronic gaming device.

4. The method of claim 1 facilitated by a network of linked electronic gaming devices.

5. The method of claim 1 further comprising a jackpot based on hands forming flushes.

6. A method of conducting a wagering game comprising:

providing a group of cards;

accepting one or more wagers from one or more players, said wagers corresponding to a number of cards forming each player's one or more hands, each of said players having an option to place wagers on hands comprising two, three, four and five cards, said wagers being accepted only prior to any cards being dealt;

dealing each player two player cards;

dealing up to three common cards;

combining with said two player cards zero to three common cards dependent on the wagers placed by the players wherein the number of common cards combined with said two player cards is dictated by a largest number of cards on which a player wager has been placed; and resolving each player's one or more wagers based on a maximum number of matching card suits in the player's one or more hands formed using zero to three of the common cards.

7. The method of claim 6 facilitated by an electronic gaming device.

8. The method of claim 6 facilitated by a network of linked gaming devices.

9. The method of claim 6 further comprising a jackpot based on flushes formed in each player's hand.

* * * * *